United States Patent
Rai et al.

(10) Patent No.: US 7,626,717 B2
(45) Date of Patent: Dec. 1, 2009

(54) PRINT JOB ALLOCATION SYSTEM AND METHOD

(75) Inventors: Sudhendu Rai, Fairport, NY (US); Jie Lin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 868 days.

(21) Appl. No.: 11/185,384

(22) Filed: Jul. 20, 2005

(65) Prior Publication Data

US 2007/0019228 A1 Jan. 25, 2007

(51) Int. Cl.
G06F 3/12 (2006.01)
(52) U.S. Cl. .............. 358/1.15; 358/1.13; 358/1.14; 718/105; 709/203; 709/206; 709/235; 709/223; 709/229
(58) Field of Classification Search ............... 358/1.15, 358/1.13, 1.14; 718/105; 709/203, 206, 709/235, 223, 229
See application file for complete search history.

(56) References Cited

U.S. PATENT DOCUMENTS

| | | | | |
|---|---|---|---|---|
| 5,287,194 A | * | 2/1994 | Lobiondo | .......... 358/296 |
| 5,918,226 A | * | 6/1999 | Tarumi et al. | .......... 707/10 |
| 6,633,821 B2 | | 10/2003 | Jackson et al. | |
| 6,659,662 B2 | * | 12/2003 | Grohs | .......... 400/76 |
| 6,805,502 B2 | | 10/2004 | Rai et al. | |
| 2002/0071134 A1 | | 6/2002 | Jackson et al. | |
| 2002/0124756 A1 | * | 9/2002 | Rai et al. | .......... 101/484 |
| 2002/0129081 A1 | * | 9/2002 | Rai et al. | .......... 709/102 |
| 2003/0149747 A1 | | 8/2003 | Rai et al. | |

OTHER PUBLICATIONS

U.S. Appl. No. 09/706,430, filed Nov. 2000, Rai et al.
U.S. Appl. No. 09/706,078, filed Nov. 2000, Squires et al.

* cited by examiner

Primary Examiner—Twyler L Haskins
Assistant Examiner—Jacky X Zheng
(74) Attorney, Agent, or Firm—Fay Sharpe LLP

(57) ABSTRACT

In a print job distribution method, a distribution is determined that assigns distribution portions of a plurality of print jobs to selected print shops. The determining of the distribution includes: (i) estimating a per job turnaround time metric for each print job respective to those print shops capable of performing the print job; (ii) estimating a per shop turnaround time metric for each print shop based on the per job turnaround time metrics estimated for that print shop and distribution portions assigned to that print shop; and (iii) optimizing respective to the distribution a load-balancing metric that is functionally dependent upon the per-shop turnaround time metrics of the print shops.

20 Claims, 4 Drawing Sheets

| PRINT SHOP | CAPABILITIES | SHOP EFFICIENCY | NO. EMPLOYEES |
|---|---|---|---|
| #1 | $b_1b_2b_3b_4b_5b_6b_7b_8$ | $b_1b_2b_3b_4$ | $b_1b_2b_3b_4$ |
| #2 | $b_1b_2b_3b_4b_5b_6b_7b_8$ | $b_1b_2b_3b_4$ | $b_1b_2b_3b_4$ |
| #3 | $b_1b_2b_3b_4b_5b_6b_7b_8$ | $b_1b_2b_3b_4$ | $b_1b_2b_3b_4$ |
| #4 | $b_1b_2b_3b_4b_5b_6b_7b_8$ | $b_1b_2b_3b_4$ | $b_1b_2b_3b_4$ |
| #5 | $b_1b_2b_3b_4b_5b_6b_7b_8$ | $b_1b_2b_3b_4$ | $b_1b_2b_3b_4$ |
| #6 | $b_1b_2b_3b_4b_5b_6b_7b_8$ | $b_1b_2b_3b_4$ | $b_1b_2b_3b_4$ |
| #7 | $b_1b_2b_3b_4b_5b_6b_7b_8$ | $b_1b_2b_3b_4$ | $b_1b_2b_3b_4$ |
| #8 | $b_1b_2b_3b_4b_5b_6b_7b_8$ | $b_1b_2b_3b_4$ | $b_1b_2b_3b_4$ |

FIG. 4 d

| | #1 | #2 | #3 | #4 | #5 | #8 | #7 | #8 |
|---|---|---|---|---|---|---|---|---|
| #1 | 0 | ## | ## | ## | ## | ## | ## | ## |
| #2 | ## | 0 | ## | ## | ## | ## | ## | ## |
| #3 | ## | ## | 0 | ## | ## | ## | ## | ## |
| #4 | ## | ## | ## | 0 | ## | ## | ## | ## |
| #5 | ## | ## | ## | ## | 0 | ## | ## | ## |
| #6 | ## | ## | ## | ## | ## | 0 | ## | ## |
| #7 | ## | ## | ## | ## | ## | ## | 0 | ## |
| #8 | ## | ## | ## | ## | ## | ## | ## | 0 | s $[\delta_{sd}]$

FIG. 5

PRINT JOB ALLOCATION SYSTEM AND METHOD

BACKGROUND

Dedicated print shops perform copying or duplication, production of multiple copies of an electronic document, and other printing-related tasks. Such print shops typically have a number of marking engines each capable of performing selected types of printing on selected media types. The types of printing a given marking engine can perform may for example include some, most, or all of: black, two-tone, or color printing, single-side printing, double-side printing, landscape- or portrait-orientation printing, and so forth. The media types can include, for example, paper of various sizes, weights, finishes, and so forth. Print shop equipment typically further includes various finishing capabilities, such as collation, hole-punching, stapling, binding, and so forth. The various pieces of equipment, such as the marking engines, paper handlers, and finishers, each have certain throughput characteristics. For example, one marking engine may be a "high-speed" printer that can print hundreds of sheets per minute, while another marking engine may operate at a lower maximum speed.

To maximize efficiency, the equipment of a print shop should be operating at close to full capacity. This suggests maximizing the number of print jobs in the queue for processing. On the other hand, if the number of queued print jobs is too high, then there will be a long turnaround time for completing print jobs.

Modern printing enterprises often include a number of print shops distributed over a geographical area. For example, a commercial copy center chain is a printing enterprise which may have locations distributed throughout a city or other geographical area. A government agency that produces large quantities of printed materials is another example of a printing enterprise that may have a number of print shop locations-distributed geographically.

In multi-shop printing enterprises, it is common practice for a print shop operating at near-maximum capacity to transfer some or all of a print job to another print shop operating at lower capacity. Such transfers are typically done in an ad hoc manner. For example, the manager of the overloaded print shop may telephone managers at other print shops to determine whether these other print shops may be able to accept additional printing work. Alternatively, the manager of a print shop operating at well below maximum capacity may call around to see if there is another print shop that has work available for transfer.

Such ad hoc transfer mechanisms are inefficient and cannot be expected to distribute the workload of the multi-shop printing enterprise in an efficient manner.

CROSS REFERENCE TO RELATED PATENTS AND APPLICATIONS

U.S. Pat. No. 6,805,502 issued Oct. 19, 2004 and assigned to Xerox Corporation is incorporated herein by reference in its entirety. This patent is entitled "Method for determining optimal batch sizes for processing print jobs in a printing environment." In some disclosed embodiments, print jobs are partitioned into sub-jobs or "batches" to shorten the turn-around time for completing the processing of the print job. The size of the batches are chosen to minimize the turnaround time. In some disclosed embodiments, the batches are processed concurrently in a pipelined fashion to minimize the turnaround time.

U.S. Published Application US 2003/0149747 A1 (Ser. No. 10/052,505 filed Feb. 1, 2002), assigned to Xerox Corporation, is incorporated herein by reference in its entirety. This published application is entitled "Method and apparatus for modeling print jobs." In some disclosed embodiments, remote print shops communicate with a central server to forward print job parameters and to receive the output from a modeling program to enable the print shop to run "what-if" scenarios to maximize print job efficiency. The central server is also provided with various other print shop tools to assist with print job design and organization.

U.S. Published Application US 2002/0071134 A1 (Ser. No. 09/735,167 filed Dec. 12, 2000), assigned to Xerox Corporation, is incorporated herein by reference in its entirety. This published application is entitled "System and method for converting print jobs stored in print shop job description language files into printshop workflow." In some disclosed embodiments, a print job extracted from a PSDL file is used to generate a proposed workflow and accompanying job cost estimate. The generated workflow merges the job resource requirements of the print job with the resource and material availability of the print shop.

U.S. Pat. No. 6,633,821 issued Oct. 14, 2003 and assigned to Xerox Corporation is incorporated herein by reference in its entirety. This published application is entitled "System for Sensing Factory Workspace." In some disclosed embodiments, a sensor senses vibrations associated with a machine. A tag associated with a job indicates the status of tasks relating to the job. A processor reads the sensor and the tag, and uses the received vibrational and task status data for workflow analysis and fault diagnosis and prediction.

U.S. Published Application US 2002/0129081 A1 (Ser. No. 09/772,118 filed Jan. 26, 2001), assigned to Xerox Corporation, is incorporated herein by reference in its entirety. This published application is entitled "Production server architecture and methods for automated control of production document management." In some disclosed embodiments, a printing workflow system is utilized for coordinating production of document processing jobs among a plurality of cells, where a cell is comprised of at least one device for completing the jobs.

The following co-pending applications assigned to Xerox Corporation are also incorporated herein by reference in their entirety: U.S. application Ser. No. 09/706,430 filed Nov. 3, 2000, relating to print shop resource optimization using autonomous cells; and U.S. application Ser. No. 09/706,078 filed Nov. 3, 2000, relating to production servers for automated control of production document management.

BRIEF DESCRIPTION

According to certain aspects disclosed herein, there is provided a print job distribution method. A plurality of print jobs are received. A distribution is determined that assigns distribution portions of the plurality of print jobs to selected print shops. The determining of the distribution includes: (i) estimating a per job turnaround time metric for each print job respective to those print shops capable of performing the print job; (ii) estimating a per shop turnaround time metric for each print shop based on the per job turnaround time metrics estimated for that print shop and distribution portions assigned to that print shop; and (iii) optimizing respective to the distribution a load-balancing metric that is functionally dependent upon the per-shop turnaround time metrics of the print shops.

According to certain aspects disclosed herein, there is provided a digital storage medium storing instructions executable by a digital computer, controller, or processor to perform a method for determining a distribution assigning distribution portions of a plurality of print jobs to selected print shops. The method includes: (i) estimating a per-shop turnaround time metric for each print shop based on per-job turnaround time metrics estimated for that print shop scaled by distribution portions assigned to that print shop by the distribution; and (ii) optimizing respective to the distribution a load-balancing metric that is functionally dependent upon the per-shop turnaround time metrics of the print shops.

According to certain aspects disclosed herein, there is provided a network server for distributing portions of a plurality of print jobs amongst a plurality of print shops. A print shops database is provided, indicating capabilities and efficiencies of each of the print shops. A delivery time database is provided, indicating delivery times for delivering print jobs between locations including at least the locations of the print shops. A processor is provided for determining the distribution portions by optimizing respective to the distribution portions a load-balancing metric that is functionally dependent upon per-shop turnaround time metrics. The per-shop turnaround time metric for each print shop is estimated based on efficiencies of the print shop indicated by the print shops database and delivery times indicated by the delivery time database.

BRIEF DESCRIPTION OF THE DRAWINGS

FIG. 4 diagrammatically shows a suitable content layout for the print shops database of FIG. 1.

FIG. 5 diagrammatically shows a suitable content layout for the delivery time database of FIG. 1.

DETAILED DESCRIPTION

Figure 1:
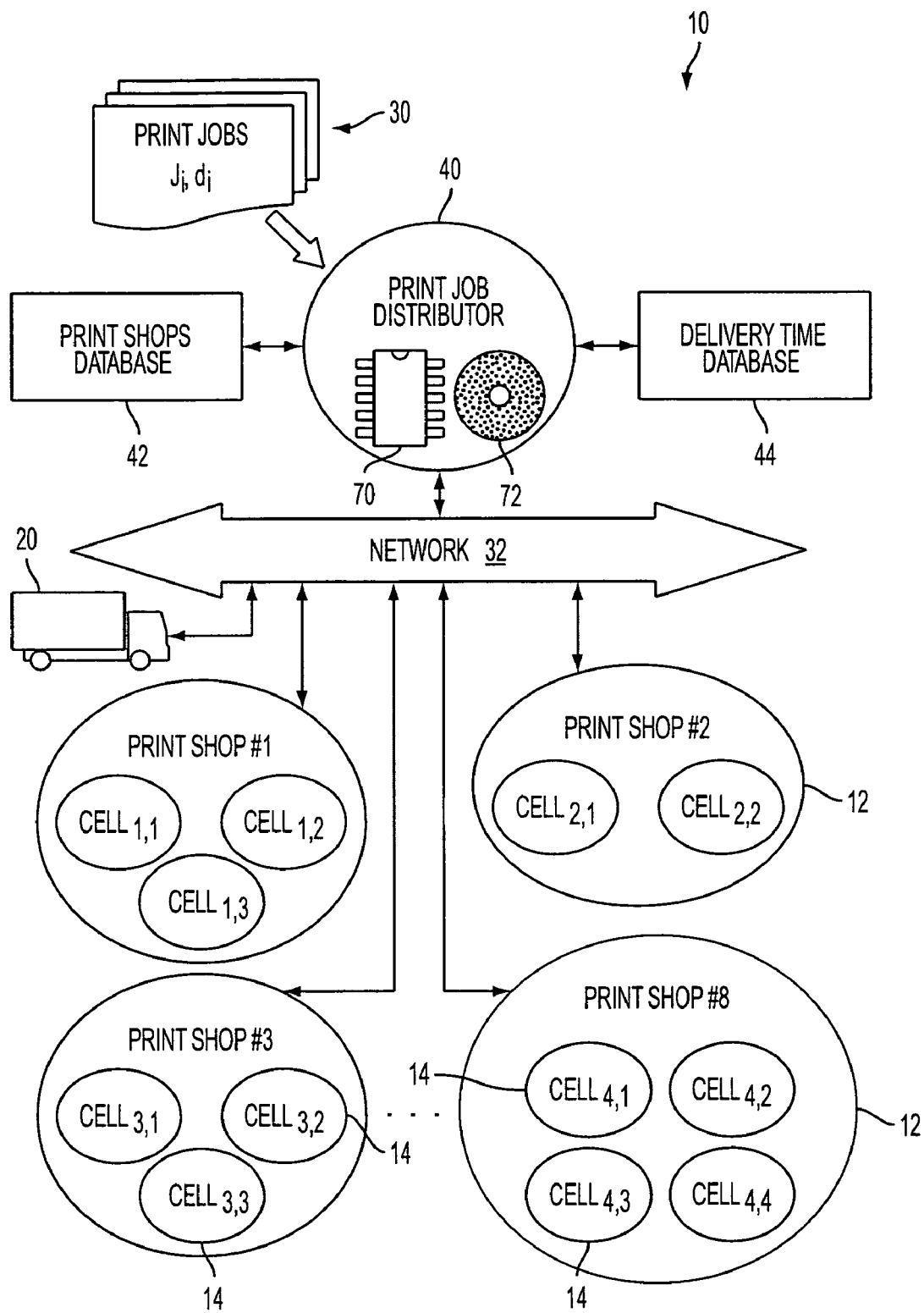
FIG. 1 diagrammatically illustrates a print job distribution system for distributing portions of print jobs amongst a plurality of print shops.

With reference to FIG. 1, a printing enterprise 10 includes a plurality of print shops. In FIG. 1, eight print shops are included in the printing enterprise 10, with four print shops 12 illustrated. Each print shop includes certain printing equipment such as marking engines, paper handlers, finishing equipment, and so forth (not illustrated), and also has a certain number of employees working at any given time to operate such printing equipment.

In some embodiments, the equipment of each print shop 12 are organized into autonomous cells 14 each capable of receiving and processing one or more classes of print jobs. Each autonomous cell typically includes one or more marking engines, various finishing capabilities such as collating, stapling, hole-punching, binding, or so forth, and optional paper handling capabilities, sufficient to process print jobs of the designated class or classes. Print jobs received by one of the print shops 12 are divided amongst the cells 14 of that print shop in a manner which efficiently uses the resources of the print shop. Different cells 14 may have different capabilities for handling different classes of print jobs. For example: some autonomous cells may include only a black marking engine, and hence be suitable for processing black-and-white print jobs but not color print jobs, while other cells may include a color marking engine; some autonomous cells may have binding capability while others may not include such capability; and so forth. The number of autonomous cells in each printing shop can vary. For example, in the illustrated example FIG. 1, the printing shops enumerated "#1" and "#3" each have three cells, the printing shop enumerated "#2" has two cells, and the printing shop enumerated "#8" has four cells. Suitable methods and systems for organizing and operating a print shop using an autonomous cells-based architecture are described in co-pending application Ser. No. 09/706,430 filed Nov. 3, 2000 and assigned to Xerox Corporation. application Ser. No. 09/706,430 is incorporated herein by reference in its entirety.

While organizing and operating the print shops 12 using autonomous cells 14 has certain efficiency advantages, the print shops 12 can be organized to process print jobs in accordance with other architectures. In the case of a small print shop, the amount of available equipment may be too small to justify organizing the print shop into a plurality of autonomous cells. In some other print shops, the equipment may be organized as an integrated system configurable into various parallel printing pathway configurations via software instructions. Such a print shop may not be amenable to organizing in accordance with a cell-based architecture.

Figure 2:
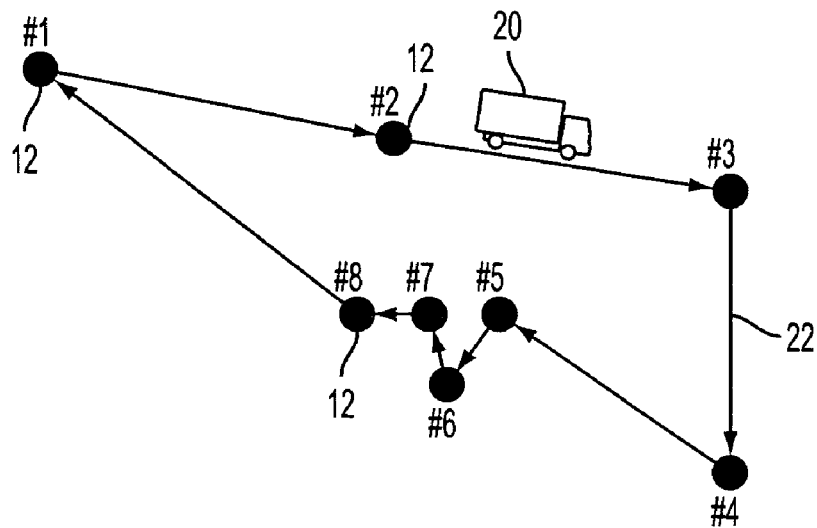
FIG. 2 diagrammatically shows geographical locations of the print shops of FIG. 1, along with a suitable geographical path of a delivery vehicle which passes through the plurality of print shops.

With continuing reference to FIG. 1 and with brief reference to FIG. 2, it is to be appreciated that the print shops 12 of the printing enterprise 10 are typically distributed geographically. In the illustrated example printing enterprise 10, there are eight printing shops 12 enumerated as: "#1", "#2", "#3", . . . , #8. In general, the printing enterprise may include any number of printing shops, such as two printing shops, five printing shops, twenty printing shops, or so forth. Completed print jobs may be transferable between printing shops 12 via a delivery vehicle 20 that follows a selected route 22 passing through the eight print shops 12. (The route 22 is diagrammatically indicated in FIG. 2 by arrows connecting the eight printing shops 12). Optionally, the route 22 may be determined by solving the traveling salesman problem for the geographical distribution of print shops 12, so as to determine a short route through the print shops 12. Optionally, the route 22 may be a complete circuit that is traversed by the delivery vehicle 20 two or more times per day. Completed print jobs may also be transferable via the, U.S. Postal Service®, UPS™, Federal Express®, or by some other common carrier. Completed jobs may also be transferable to a customer or client location via the delivery vehicle 20 and/or by common carrier. In some cases, the "geographical distribution" may be small. For example, a world headquarters of a large corporation may have two or more different print shops in the same office building, for example to serve different departments housed in the same world headquarters office building.

With continuing reference to FIG. 1, a plurality of print jobs 30 are received by the printing enterprise 10. Each print job is associated with a source that is to be converted into one or more hardcopies, and with instructions as to the quantity and nature of those hardcopies. For example, the source can be a received stack of papers which are to be reproduced to make copies, such as one hardcopy, ten hardcopies, fifty hardcopies, five-hundred hardcopies, or so forth. Optionally, the source for a print job can be received in electronic form, for example as an electronic word processing file, presentation file, or so forth, which is to be printed once or a plurality of times to make one hardcopy, ten hardcopies, fifty hardcopies, five-hundred hardcopies, or so forth. The instructions may specify that the hardcopy or hardcopies are to be printed on paper sheets, on overhead transparency sheets, or so forth.

In some cases, the instructions may specify that different copies are to be printed on different media. For example, the instructions may specify five copies on quality high-gloss, high-weight paper, and fifty copies on lower quality paper. Similarly, the instructions may specify a certain number of color copies, and a certain number of black-and-white copies.

The printing enterprise 10 can receive a print job in various ways. For example, if the printing enterprise is a commercial copy center chain in which each of the printing shops 12 is a copy center location, then print jobs may be received by customers who drop off a source stack of papers with a specific one of the copy centers, along with instructions to make a certain number of copies with certain characteristics (such as print media specification, binding specification, color or black-and-white specification, or so forth). In some cases, the source for a print job along with printing instructions may be received electronically via a network 32 (which can be a wired network, a wireless network, or some combination thereof), such as the Internet or via email. If the printing enterprise 10 is a corporate or government printing enterprise, the printing shops 12 may be printing shops in various divisions, branches, or other spatially separated locations, and the printing jobs may be received by a customer or client dropping off physical source sheets, or by a customer or client delivering the source electronically via email, a corporate data network, or so forth.

Figure 3:
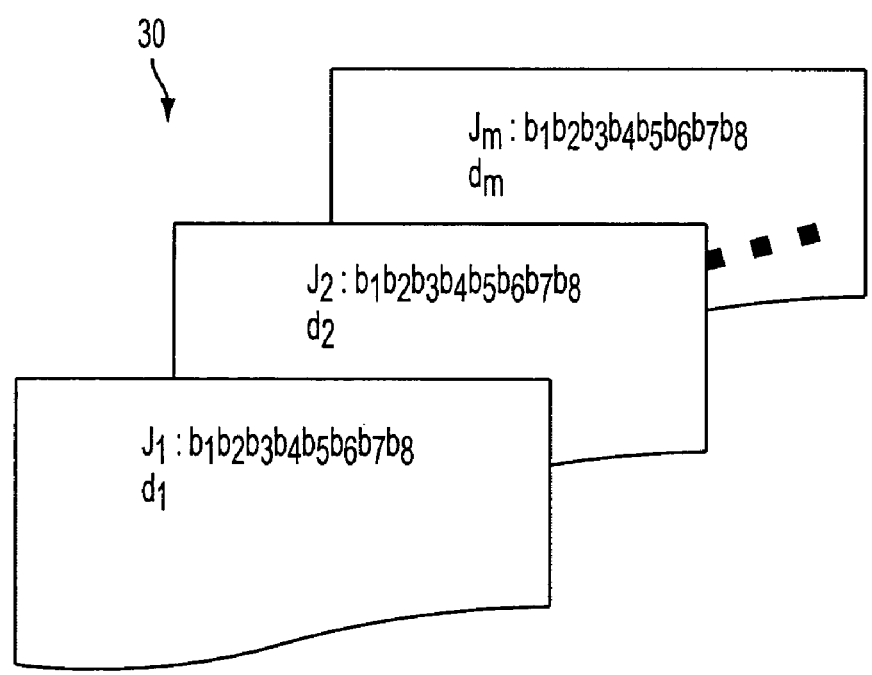
FIG. 3 diagrammatically shows a plurality of print jobs.

With continuing reference to FIG. 1 and with brief reference to FIG. 3, each print job (designated as "$J_i$" herein) is suitably tagged with information pertaining to the print job. For example, the print job can be tagged by capabilities called for to perform the print job, such as a designation that the print job is a color print job, or that it calls for certain binding, stapling, or other finishing capabilities, or that it calls for certain print media, or so forth. In the illustrated embodiment, such capability specifications are encoded in an eight-bit binary tag denoted as "$b_1\ b_2\ b_3\ b_4\ b_5\ b_6\ b_7\ b_8$" in FIG. 3. For example, the bits "$b_1\ b_2$" may designate marking characteristics (e.g., "00"=black printing; "01"=two-tone printing; and "11"=full color printing). Other bits can similarly represent finishing requirements, print media requirements, or so forth. The binary tag of FIG. 3 is an illustrative example; the tags can employ other encodings or representations, including textual or other non-binary encodings. Typically, the tag is annotated to the print job by an employee or automated software of the printing enterprise 10 when the print job is received or some time thereafter. Each print job is also tagged with destination information, denoted as "$d_i$" for corresponding print job "$J_i$" in FIG. 3. The destination may be, for example, the print shop 12 that receives the print job, another print shop 12 designated by the customer or client as the pick-up location, the customer's address, or so forth.

A print job distributor 40 distributes each of the print jobs 32 amongst one or more of the print shops 12 so as to efficiently use the printing resources provided by the print shops 12. The print job distributor 40 assigns distribution portions of each print job to a selected one or more of the print shops 12. The print job distributor 40 takes into account the throughput capabilities of each print shop 12 and delivery time considerations for delivering each print job or print job portion from the assigned print shop 12 to the destination "$d_i$" of that print job "$J_i$". The print job distributor 40 accesses a print shops database 42 to estimate capabilities and efficiencies of each of the print shops 12, and accesses a delivery time database 44 to estimate the delivery times.

With continuing reference to FIG. 1 and with brief reference to FIG. 4, one suitable content layout for the print shops database 42 identifies capabilities of each print shop using an eight-bit binary code having a format corresponding to the eight-bit binary tags of the print jobs 30. For example, the first two bits of the capabilities may designate marking capabilities of the print shop (e.g., "00"=black printing; "01"=two-tone printing; and "11"=full color printing). This makes for straightforward determination of whether a given print shop 12 is capable of handling a given print job "$J_i$", since the first two bits of both the print job tag and the print shop capabilities code identify the marking class (black, two-tone, or color). The eight-bit capabilities representation shown in FIG. 4 is an example; other encodings or representations, including non-binary encodings, can be employed—more bits may be provided to identify larger numbers of employees The example content layout for print shops database 42 shown in FIG. 4 also includes a four-bit code indicating shop efficiency, for example ranging from binary "0000"=highly inefficient, to binary "1111"=highly efficient. The shop efficiency code can be derived from past throughput performance of the printing shop, quality of equipment possessed by the print shop, or so forth. While only a single efficiency code is shown in FIG. 4, optionally additional efficiency codes can be included for different classes of print jobs. For example, a given print shop having several black marking engines but only a single color marking engine may be very efficient for black-and-white print jobs, but be much less efficient for color print jobs. This can be reflected by optionally providing two efficiency codes—one for black print jobs, and another for color print jobs. The example content layout for print shops database 42 shown in FIG. 4 still further includes a four-bit code indicating the number of employees working at the print shop at any given time. With four bits, any number from 0-15 employees can be encoded. The number of employees may be updated to reflect differences in print shop staffing depending upon the day of the week, the time of day, or so forth. The number of employees may be pre-determined (based for example on the number of employees scheduled to work at a given shift) or dynamically determined (based for example on a real-time link via the network 32 with an employee time clock located at the print shop 12). Similarly, the efficiency codes may be updated to reflect temporary loss of printing capacity due to a failed marking engine or other hardware problem. The content layout for print shops database 42 shown in FIG. 4 is an example; other encodings or representations can be used, and moreover the print shops database may include more, less, or different information than that shown in the example content layout of FIG. 4.

With continuing reference to FIG. 1 and with brief reference to FIG. 5, one suitable content layout for the delivery time database 44 is a two-dimensional time table indicating travel times $\delta_{sd}$ between a source print shop "s" and a destination print shop "d" (corresponding to the print job destination "$d_i$" for print job "$J_i$"). When using the one-way repeating delivery route 22, it will be appreciated that in general $\delta_{sd} \neq \delta_{ds}$, since the one-way delivery route 22 is directional. In large printing enterprises, there may be numerous delivery vehicles that pick up and deliver a completed print job on short notice, or alternatively delivery may be by common carrier. In such cases, a reasonable delivery time estimate may set $\delta^{sd} = \delta_{ds}$, in which case the delivery time matrix is symmetric, and the upper-right or lower-left half of the two-dimensional time table is optionally omitted. On the other hand, more sophisticated delivery time estimates may be used, which may require more data to be stored in the delivery time database 44. For example, in some embodiments the trucks route is alterable in real-time responsive to which print shop needs deliveries most urgently, and the delivery time is then estimated based on the instantaneous route. The delivery time database 44 may also include estimates of traffic delays, such as rush hour delays.

Figure 6:
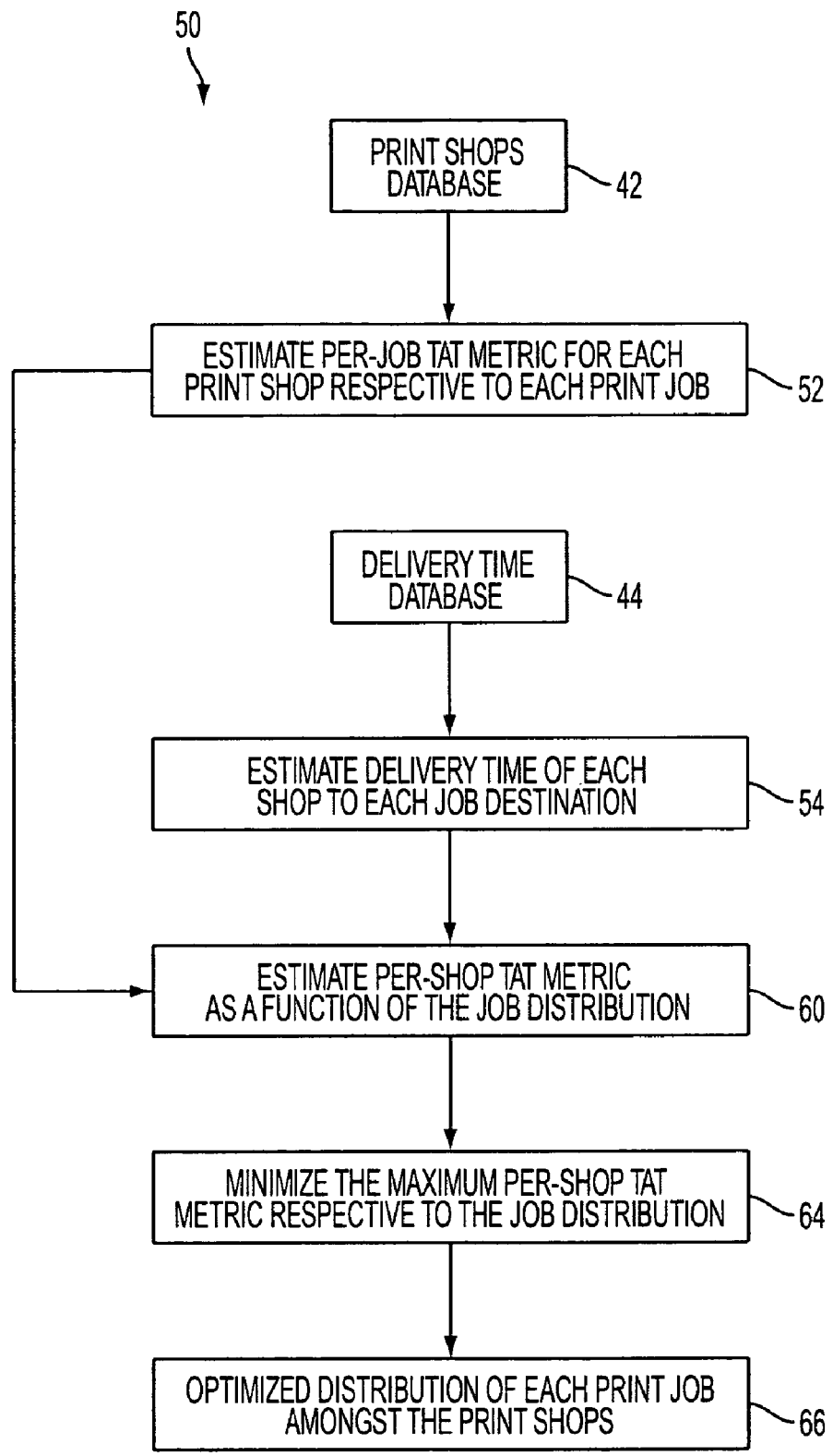
FIG. 6 diagrammatically shows a suitable print jobs distribution method performed by the print job distributor of FIG. 1.

With continuing reference to FIG. 1 and with further reference to FIG. 6, an example method 50 is described which is suitably performed by the print job distributor 40 to determine a distribution assigning distribution portions of the plurality of print jobs to selected print shops 12. In a process operation 52, a per-job turnaround time ("TAT") metric is estimated for each of the print shops 12 respective to each print job "$J_i$". The per-job turnaround time metric is optionally a conservative metric which is not an effective metric for estimating absolute turnaround time for a given distribution of the print jobs, but which is an effective metric for estimating relative turnaround times for different distributions of print jobs. The per-job turnaround time metric is optionally estimated for a given print job respective to each print shop 12 assuming that the print shop 12 processes only that print job. This optional assumption is unlikely to produce an accurate absolute turnaround time in view of the likelihood that any given print shop is likely to be assigned more than one print job; however, it has been found by the inventors to be an effective metric for estimating relative turnaround times for different distributions of print jobs. The per-job turnaround time is suitably estimated based on the content of the print shops database 42. For example, using the example content layout of FIG. 4, the per-job turnaround time metric may be estimated based on the shop efficiency value adjusted by the number of employees currently working. Such a per-job turnaround time metric accounts for both the equipment and the personnel available to operate the equipment. If different efficiency values are tabulated in the print shops database 42 for different classes of print jobs, the appropriate efficiency value should be used for the class of the print job "$J_i$" when estimating the per-job turnaround time metric for the print job "$J_i$".

With continuing reference to FIG. 6, in a process operation 54 the delivery time for delivering the completed print job from a given print shop 12 to the job destination ("$d_i$" for print job "$J_i$") is estimated. For example, using the example content layout of FIG. 5, the delivery time is suitably estimated from the tabulated delivery time $\delta_{sd}$ for delivery from the source print shop denoted by "s" to the destination print shop denoted by "d" (corresponding to "$d_i$"). Other approaches can be used to estimate the delivery time, for example including taking into account traffic conditions.

In a process operation 60, a per-shop turnaround time (TAT) metric is estimated as a function of the job distribution. The job distribution is suitably represented as a matrix $[\beta_{ki}]$ of distribution portions $\beta_{ki}$ where the index "k" denotes the print shop 12 and the index "i" denotes the print job "$J_i$". For example, a job distribution portion $\beta_{3,4}=0.5$ indicates that one-half of the print job "$J_4$" is to be performed by the print shop #3. The distribution portions $\beta_{ki}$ are subject to a normalization constraint:

$$\sum_{k=1}^{n} \beta_{ki} = 1, \quad (1)$$

where the limit "n" denotes the number of print shops 12. For the illustrated embodiment, n=8; however, more generally the printing enterprise can include any number of print shops. The normalization constraint of Equation (1) sets forth that the distribution portions of a given print job must encompass the entire print job.

The per-job turnaround time estimated in the process operation 52 is suitably denoted herein as $t_{ik}$, where again the index "i" denotes the print job "$J_i$" and the index "k" denotes the print shop 12. Using this notation, the per-shop turnaround time metric is suitably denoted $t_k$, and is suitably estimated in the process operation 60 according to:

$$t_k = \sum_{i=1}^{m} (\beta_{ki} \cdot t_{ik}) + \delta_{kd}, \quad (2)$$

where the limit "m" denotes the number of print jobs 30, and $\delta_{kd}$ denotes the delivery time from the source print shop denoted by index "k" to a destination denoted "d" corresponding to the destination "$d_i$" for print job "$J_i$". In some embodiments, it is contemplated to omit the delivery time term $\delta_{kd}$ from Equation (2); for example, if the print shops 12 are geographically concentrated into a small area, and/or if a large number of delivery vehicles are provided, such that delivery times are negligible.

If a given print shop is incapable of handling a particular print job, this situation can be handled in various ways. For example, in some embodiments, the index "k" in Equations (1) and (2) is prevented from running over any print shops that are incapable of handling a given print job "$J_i$". In other embodiments, the index "k" in Equations (1) and (2) continues to run over any print shops that are incapable of handling a given print job "$J_i$", but the distribution portion $\beta_{ki}$ is fixed at zero value for those print shops that cannot handle the print job. Fixing the distribution portion $\beta_{ki}$ at zero value for a given print shop ensures that no portion of the print job "$J_i$" is submitted to that print shop for processing.

With continuing reference to FIG. 6, in a process operation 64 a maximum per-shop turnaround time metric $(t_k)_{max}$ is minimized respective to the job distribution $[\beta_{ki}]$, subject to the normalization constraint of Equation (1), to yield an optimized distribution 66 of each print job "$J_i$" amongst the print shops 12. That is, the distribution portions $\beta_{ki}$ are adjusted to minimize $(t_k)_{max}$, subject to the constraint of Equation (1). Such an optimization is known as a "min-max" optimization, and can be performed using any suitable constrained optimization algorithm such as, for example, an iterative optimization constrained by Equation (1). In one suitable approach, a slack variable α is introduced, and the following minimization:

$$\min\{\alpha\} \text{ where } t_k = \{1, \ldots, n\} \text{ subject to Equation (1)} \quad (3)$$

is performed respective to the job distribution $[\beta_{ki}]$. The minimization can be performed using an iterative genetic algorithm, an iterative simulated annealing algorithm, or so forth.

Optionally; the optimized distribution 66 may correspond to other than the global minimum of $(t_k)_{max}$ respective to the distribution $[\beta_{ki}]$. For example, the iterative optimization can be terminated upon satisfying a termination criterion such as: (i) the maximum estimated per-shop turnaround time metric after an iteration being less than an absolute iteration termination value; or (ii) a change in the maximum estimated per-shop turnaround time metric between successive iterations being less than a relative iteration termination value. For example, the printing enterprise 10 may assure its customers or clients that a certain guaranteed turnaround time will be met for all print jobs. In such situations, the absolute iteration termination value criterion may be used, with the absolute iteration termination value equal to the guaranteed turnaround time (perhaps with some margin of safety, such as setting the iteration termination value equal to 90% of the guaranteed termination time) so as to ensure that every print job meets the guaranteed turnaround time.

In the illustrated process operation 64, the maximum per-shop turnaround time metric $(t_k)_{max}$ is minimized respective to the job distribution $[\beta_{ki}]$, subject to the normalization constraint of Equation (1), to yield an optimized distribution 66 of each print job "$J_i$" amongst the print shops 12. In the illustrated embodiment, the maximum estimated per-shop turnaround time metric serves as a load-balancing metric, and by minimizing this load-balancing metric respective to the job distribution $[\beta_{ki}]$ in the process operation 64 an optimized distribution 66 is obtained. In this embodiment, the load-balancing metric $(t_k)_{max}$ is given by:

$$\text{load-balancing metric} = (t_k)_{max} \qquad (4)$$
$$= \max_k \left\{ \sum_{i=1}^m (\beta_{ki} \cdot t_{ik}) + \delta_{kd} \right\},$$

The load-balancing metric of Equation (4) advantageously ensures that even the slowest print shop completes its jobs in the optimized time. Other print job load-balancing metrics can be used instead of the maximum per-shop turnaround time metric $(t_k)_{max}$ to determine the optimized distribution 66 of each print job amongst the print shops. For example, the load-balancing metric can be a square of the per-shop turnaround time metric $t_k$ summed over the print shops 12:

$$\text{load-balancing metric} = \sum_{k=1}^n (t_k)^2 \qquad (5)$$
$$= \sum_{k=1}^n \left( \sum_{i=1}^m \beta_{ki} \cdot t_{ik} \right) + \delta_{kd},$$

or can be a weighted sum of the estimated per-shop turnaround time metric $t_k$. As an example of the latter load-balancing metric, the weight for each print shop 12 can be the summed job portions assigned to that print shop, yielding the weighted load-balancing metric:

$$\text{load-balancing metric} = \sum_{k=1}^n \left( \left( \sum_{i=1}^m \beta_{ki} \right) (t_k) \right), \qquad (6)$$

where $t_k$ is given in Equation (2). This weighted load-balancing metric gives greater effect to minimizing the turnaround time of print job shops that are carrying a substantial portion of the print job distribution. In general, the load-balancing metric is optimized respective to the job distribution $[\beta_{ki}]$, subject to the normalization constraint of Equation (1), to yield the optimized distribution 66 of each print job "$J_i$" amongst the print shops 12. The example load-balancing metrics of Equations (4)-(6) are suitably minimized to optimize the job distribution $[\beta_{ki}]$; however, it is also contemplated to employ a load-balancing metric that is maximized to optimize the job distribution $[\beta_{ki}]$. Moreover, if the optimization is iterative, then the iterative optimization can be terminated upon satisfying a termination criterion such as: (i) the load-balancing metric after an iteration satisfying an absolute iteration termination threshold; or (ii) a change in the load-balancing metric between successive iterations being less than a relative iteration termination value.

With returning reference to FIG. 1, the print job distributor 40 can be embodied in various ways. For example, the print job distributor 40 can be embodied by a digital computer, controller, or processor 70 that executes instructions stored on a digital storage medium 72 (such as the illustrated optical disk, or a magnetic disk, or RAM, or a FLASH memory, or so forth) to perform the print job distribution method 50. The print job distributor 40 can be embodied as illustrated in FIG. 1 as a network server that communicates with the print shops 12 via the network 32 (which may be a wireless network, a wired network, or some combination thereof) to schedule print jobs. Optionally, the print job distributor 40 also communicates with the driver of the delivery vehicle 20 via wireless networking, so that the driver knows in real time what print jobs deliveries are scheduled. In other embodiments, the print job distributor may be disposed at a coordinating one of the print shops which acts as a coordinator for scheduling printing activities of all the print shops. It is also contemplated to deploy the print job distributor as distributed software executing on intercommunicating digital computers, controllers, or processors disposed at two or more of the print shops.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A print job distribution method comprising:
   receiving a plurality of print jobs; and
   determining a distribution that assigns distribution portions of the plurality of print jobs to selected print shops, the determining of the distribution including:
   (i) estimating a per-job turnaround time metric for each print job respective to those print shops capable of performing the print job,
   (ii) estimating a per-shop turnaround time metric for each print shop based on the per-job turnaround time metrics estimated for that print shop and distribution portions assigned to that print shop, and
   (iii) optimizing respective to the distribution a load-balancing metric functionally dependent upon the per-shop turnaround time metrics of the print shops.

2. The method as set forth in claim 1, wherein the optimizing iterates, the iterating terminating when a termination criterion is satisfied, the termination criterion including one or more criteria selected from a group consisting of:
   the load-balancing metric satisfying an absolute iteration termination threshold, and
   a change in the load-balancing metric between successive iterations being less than a relative iteration termination value.

3. The method as set forth in claim 1, wherein the estimating of the per-job turnaround time metric comprises:
   estimating the per-job turnaround time metric for the print job respective to each print shop assuming that the print shop processes only that print job.

4. The method as set forth in claim 1, wherein the estimated per-job turnaround time metric is not an accurate metric for estimating absolute turnaround time for a given distribution of the print jobs.

5. The method as set forth in claim 1, wherein the estimating of the per-shop turnaround time metric for a print shop for which the per-shop turnaround time metric is being estimated comprises:

computing a sum of the per-job turnaround time metrics estimated for that the print shop for which the per-shop turnaround time metric is being estimated scaled by the distribution portions assigned to that the print shop for which the per-shop turnaround time metric is being estimated.

6. The method as set forth in claim 5, wherein the estimating of the per-job turnaround time metric further comprises:

adding to the sum a delivery time for delivery from the print shop for which the per-shop turnaround time metric is being estimated to a job destination.

7. The method as set forth in claim 1, wherein the estimating of the per-job turnaround time metric for each print job respective to those print shops capable of performing the print job comprises:

estimating a delivery time for delivering the completed print job from each print shop capable of performing the print job to a job destination.

8. The method as set forth in claim 7, wherein the estimating of the delivery time is based on an estimated travel time between the print shop and the job destination for a delivery vehicle which follows a selected geographical path passing through the plurality of print shops.

9. The method as set forth in claim 8, further comprising:

determining the selected geographical path followed by the delivery vehicle by solving a traveling salesman problem respective to geographical locations of the plurality of print shops.

10. The method as set forth in claim 7, wherein the estimating of the delivery time includes estimating a mailing time for mailing the completed print job from each print shop capable of performing the print job to the job destination.

11. The method as set forth in claim 7, wherein the job destination for the estimating of the delivery time is one of:

a receiving print shop that receives each print job, and a customer location.

12. The method as set forth in claim 1, wherein the load-balancing metric is selected from a group consisting of:

a maximum estimated per-shop turnaround time metric, a sum of squares of the estimated per-shop turnaround time metrics, and a weighted sum of the estimated per-shop turnaround time metrics.

13. A digital storage medium storing instructions executable by a digital computer, controller, or processor to perform a method for determining a distribution assigning distribution portions of a plurality of print jobs to selected print shops, the method including: (i) estimating a per-shop turnaround time metric for each print shop based on per-job turnaround time metrics estimated for that print shop scaled by distribution portions assigned to that print shop by the distribution, and (ii) optimizing respective to the distribution a load-balancing metric that is functionally dependent upon the per-shop turnaround time metrics of the print shops.

14. The digital storage medium as set forth in claim 13, wherein the estimating (i) of the per-shop turnaround time metric includes estimating the per-job turnaround time metric for each print job respective to the print shop assuming that the print shop processes only that print job.

15. The digital storage medium as set forth in claim 13, wherein the estimating (i) of the per-shop turnaround time metric includes estimating the per-job turnaround time metric only for those print jobs that the print shop is capable of performing.

16. The digital storage medium as set forth in claim 13, wherein the estimating (i) of the per-shop turnaround time metric includes assigning a distribution portion having a value of zero for any print job that the print shop is not capable of performing.

17. The digital storage medium as set forth in claim 13, wherein the estimated per-shop turnaround time metric is not an accurate metric for estimating absolute turnaround times for the print shops.

18. The digital storage medium as set forth in claim 13, wherein the estimating (i) of the per-shop turnaround time metric includes estimating a delivery time for delivering to a job destination each print job for which the print shop has a distribution portion whose value is not zero.

19. The digital storage medium as set forth in claim 13, wherein the load-balancing metric is a maximum estimated per-shop turnaround time metric.

20. The digital storage medium as set forth in claim 13, wherein the load-balancing metric is an additive combination of the estimated per-shop turnaround time metrics.

* * * * *